United States Patent
Long et al.

(10) Patent No.: US 7,181,854 B2
(45) Date of Patent: ***Feb. 27, 2007

(54) LASER LEVELING DEVICE HAVING A SUCTION MOUNTING ARRANGEMENT

(75) Inventors: Charles Keith Long, Seneca, SC (US); Kevin A. Moore, Anderson, SC (US); Charles M. Wacker, Chandler, AZ (US); Skye V. Taylor, Anderson, SC (US)

(73) Assignee: Eastway Fair Company Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 10/919,708

(22) Filed: Aug. 17, 2004

(65) Prior Publication Data

US 2006/0037202 A1  Feb. 23, 2006

(51) Int. Cl.
*G01C 15/00*  (2006.01)
(52) U.S. Cl. ............... 33/286; 33/DIG. 21; 248/205.5
(58) Field of Classification Search ............... 33/286, 33/DIG. 21, 227, 276, 290, DIG. 2; 248/362, 248/363, 205.5
See application file for complete search history.

(56) References Cited

U.S. PATENT DOCUMENTS

| | | | |
|---|---|---|---|
| 2,600,857 A | 6/1952 | De La Mater | |
| 2,615,426 A * | 10/1952 | Fryer ..................... 144/28.6 | |
| 2,711,030 A | 6/1955 | Drew et al. | |
| 2,992,487 A | 7/1961 | Miller | |
| 3,489,324 A | 1/1970 | Stohl | |
| 3,675,886 A * | 7/1972 | Kampmier ................. 248/363 | |
| 3,724,953 A | 4/1973 | Johnston, Jr. | |
| 3,897,637 A | 8/1975 | Genho | |
| 4,063,365 A * | 12/1977 | Hopkins et al. ............... 33/288 |
| 4,225,106 A | 9/1980 | Eplan | |
| 4,703,563 A | 11/1987 | Hoshino et al. | |
| 4,852,265 A | 8/1989 | Rando et al. | |
| 4,853,617 A | 8/1989 | Douglas et al. | |
| 4,907,769 A | 3/1990 | Hunley et al. ........... 248/185.1 |
| 4,912,851 A | 4/1990 | Rando et al. | |
| 4,924,597 A | 5/1990 | Tursi | |
| 4,992,741 A | 2/1991 | Douglas et al. | |
| 5,063,679 A * | 11/1991 | Schwandt ................... 33/347 |
| 5,075,977 A | 12/1991 | Rando | |
| 5,144,487 A | 9/1992 | Hersey | |
| 5,182,863 A | 2/1993 | Rando | |

(Continued)

FOREIGN PATENT DOCUMENTS

EP          0 977 007 A1     2/2000

(Continued)

*Primary Examiner*—Diego Gutierrez
*Assistant Examiner*—Amy R. Cohen
(74) *Attorney, Agent, or Firm*—Brinks Hofer Gilson & Lione; G. Peter Nichols

(57) ABSTRACT

A laser leveling device having a suction mounting arrangement includes a housing and a mounting seal extending from the lower portion of the housing. The mounting seal cooperates with an attachment surface to define a suction mounting area therebetween. The suction mounting arrangement cooperates with the mounting seal to maintain the vacuum pressure seal in the suction mounting area. A laser light source mounted within the housing in a planar relationship relative to the attachment surface includes at least one diode projecting an alignment beam through an opening in the housing to denote a reference plane along the attachment surface.

14 Claims, 5 Drawing Sheets

U.S. PATENT DOCUMENTS

| | | | |
|---|---|---|---|
| 5,218,770 A * | 6/1993 | Toga | 33/276 |
| 5,253,421 A | 10/1993 | Landmark | |
| 5,287,627 A | 2/1994 | Rando | |
| 5,352,974 A | 10/1994 | Heger | |
| 5,366,129 A | 11/1994 | Nakamura et al. | |
| 5,394,616 A | 3/1995 | Claxton | |
| 5,400,514 A | 3/1995 | Imbrie et al. | |
| 5,459,932 A | 10/1995 | Rando et al. | |
| 5,519,942 A | 5/1996 | Webb | |
| 5,524,352 A | 6/1996 | Rando et al. | |
| 5,531,031 A | 7/1996 | Green | |
| 5,541,727 A | 7/1996 | Rando et al. | |
| 5,552,886 A | 9/1996 | Kitajima et al. | |
| 5,584,458 A | 12/1996 | Rando | |
| 5,594,993 A | 1/1997 | Tager et al. | |
| 5,610,711 A | 3/1997 | Rando | |
| 5,617,202 A | 4/1997 | Rando | |
| 5,617,645 A | 4/1997 | Wick et al. | |
| 5,619,128 A | 4/1997 | Heger | |
| 5,619,802 A | 4/1997 | Rando et al. | |
| 5,621,975 A | 4/1997 | Rando | |
| 5,630,517 A | 5/1997 | Maznik | |
| 5,655,307 A | 8/1997 | Ogawa et al. | |
| 5,713,135 A | 2/1998 | Acopulos | |
| 5,748,306 A | 5/1998 | Louis | |
| 5,773,721 A | 6/1998 | Bashyam | |
| 5,795,001 A * | 8/1998 | Burke | 294/64.1 |
| 5,819,424 A | 10/1998 | Ohtomo et al. | |
| 5,829,152 A | 11/1998 | Potter et al. | |
| 5,842,282 A | 12/1998 | Ting | |
| 5,859,693 A | 1/1999 | Dunne et al. | |
| 5,864,956 A | 2/1999 | Dong | |
| 5,872,657 A | 2/1999 | Rando | |
| 5,894,675 A | 4/1999 | Cericola | |
| 5,900,931 A | 5/1999 | Rando | |
| 5,905,455 A | 5/1999 | Heger et al. | |
| 5,917,314 A | 6/1999 | Heger et al. | |
| 5,917,587 A | 6/1999 | Rando | |
| D412,674 S | 8/1999 | Kaiser | |
| D412,857 S | 8/1999 | Howard et al. | |
| 5,949,529 A | 9/1999 | Dunne et al. | |
| 5,956,861 A | 9/1999 | Barnes | |
| D415,436 S | 10/1999 | Martone | |
| 5,999,346 A | 12/1999 | Grundstrom et al. | |
| 6,005,719 A | 12/1999 | Rando | |
| D418,432 S | 1/2000 | Krantz | |
| D418,434 S | 1/2000 | Krantz | |
| D418,763 S | 1/2000 | Krantz | |
| D419,149 S | 1/2000 | Krantz et al. | |
| D419,544 S | 1/2000 | Krantz | |
| D419,545 S | 1/2000 | Krantz et al. | |
| D419,546 S | 1/2000 | Krantz et al. | |
| 6,009,630 A | 1/2000 | Rando | |
| 6,012,229 A | 1/2000 | Shiao | |
| D420,972 S | 2/2000 | Brecher et al. | |
| 6,023,159 A | 2/2000 | Heger | |
| 6,030,091 A | 2/2000 | Li | |
| 6,037,874 A | 3/2000 | Heironimus | |
| 6,065,217 A | 5/2000 | Dong | |
| 6,067,152 A | 5/2000 | Rando | |
| D427,166 S | 6/2000 | Krantz | |
| 6,073,353 A | 6/2000 | Ohtomo et al. | |
| 6,137,564 A | 10/2000 | Schmidt et al. | |
| 6,157,591 A | 12/2000 | Krantz | |
| 6,163,969 A | 12/2000 | Jan et al. | |
| 6,178,655 B1 | 1/2001 | Potter et al. | |
| 6,198,271 B1 | 3/2001 | Heger et al. | |
| 6,202,312 B1 | 3/2001 | Rando | |
| 6,209,219 B1 | 4/2001 | Wakefield et al. | |
| 6,211,662 B1 | 4/2001 | Bijawat et al. | |
| 6,215,293 B1 | 4/2001 | Yim | |
| 6,219,931 B1 | 4/2001 | Roth | 33/645 |
| 6,223,446 B1 | 5/2001 | Potter | |
| 6,249,113 B1 | 6/2001 | Krantz et al. | |
| 6,259,241 B1 | 7/2001 | Krantz | |
| 6,262,801 B1 | 7/2001 | Shibuya et al. | |
| 6,301,997 B1 | 10/2001 | Welte | |
| 6,351,890 B1 * | 3/2002 | Williams | 33/286 |
| 6,360,446 B1 | 3/2002 | Bijawat et al. | |
| D455,430 S | 4/2002 | Krantz | |
| D455,750 S | 4/2002 | Krantz | |
| 6,382,574 B1 * | 5/2002 | Pando | 248/205.8 |
| D461,135 S | 8/2002 | Watson et al. | |
| 6,427,347 B1 | 8/2002 | Butler, Sr. | |
| D464,578 S | 10/2002 | Zurwelle | |
| 6,493,952 B1 | 12/2002 | Kousek et al. | |
| D469,556 S | 1/2003 | Malard et al. | |
| 6,502,319 B1 | 1/2003 | Goodrich et al. | |
| D470,423 S | 2/2003 | Loudenslager et al. | |
| 6,532,675 B2 | 3/2003 | Letourneau | |
| 6,532,676 B2 | 3/2003 | Cunningham | |
| D474,985 S | 5/2003 | Cooper et al. | |
| D475,938 S | 6/2003 | Lopano | |
| 6,577,388 B2 | 6/2003 | Kallabis | |
| 6,581,296 B2 | 6/2003 | Ponce | |
| D476,584 S | 7/2003 | Zurwelle | |
| 6,593,754 B1 | 7/2003 | Steber et al. | |
| 6,594,910 B2 | 7/2003 | Wishart | |
| 6,606,798 B2 | 8/2003 | El-Katcha et al. | |
| 6,612,714 B1 | 9/2003 | Morre et al. | 362/191 |
| 6,625,895 B2 | 9/2003 | Tacklind et al. | |
| 6,640,456 B2 | 11/2003 | Owoc et al. | |
| 6,674,276 B2 | 1/2004 | Morgan et al. | |
| 6,782,034 B2 * | 8/2004 | Li | 372/109 |
| 6,880,256 B2 * | 4/2005 | Helms | 33/286 |
| 6,964,545 B1 | 11/2005 | Languasco | 408/16 |
| 7,044,622 B2 * | 5/2006 | Marshall | 362/397 |
| 2001/0007420 A1 | 7/2001 | Bijawat et al. | |
| 2001/0029675 A1 | 10/2001 | Webb | |
| 2001/0034944 A1 | 11/2001 | Cunningham | |
| 2001/0049879 A1 | 12/2001 | Moore | |
| 2001/0053313 A1 | 12/2001 | Luebke | |
| 2002/0017028 A1 | 2/2002 | Wishart | |
| 2002/0059735 A1 | 5/2002 | Ponce | |
| 2002/0069543 A1 | 6/2002 | Owoc et al. | |
| 2002/0073561 A1 | 6/2002 | Liao | |
| 2002/0152621 A1 | 10/2002 | Letourneau | |
| 2002/0162233 A1 | 11/2002 | El-Katcha et al. | |
| 2002/0166249 A1 | 11/2002 | Liao | |
| 2002/0178596 A1 | 12/2002 | Malard et al. | |
| 2002/0193964 A1 | 12/2002 | Hsu | |
| 2003/0061720 A1 | 4/2003 | Waibel | |
| 2003/0101605 A1 | 6/2003 | Tacklind et al. | |
| 2003/0131491 A1 | 7/2003 | Weeks | |
| 2003/0201783 A1 | 10/2003 | Steber et al. | |
| 2003/0218469 A1 | 11/2003 | Brazell et al. | |
| 2003/0231303 A1 | 12/2003 | Raskin et al. | |
| 2004/0000918 A1 | 1/2004 | Sanoner et al. | |
| 2004/0004825 A1 | 1/2004 | Malard et al. | |
| 2004/0031163 A1 | 2/2004 | El-Katcha et al. | |
| 2004/0205972 A2 | 10/2004 | Wu | 33/286 |
| 2005/0022399 A1 * | 2/2005 | Wheeler et al. | 33/286 |
| 2005/0066533 A1 * | 3/2005 | Wheeler et al. | 33/286 |
| 2005/0155238 A1 | 7/2005 | Levine et al. | 33/286 |
| 2005/0198845 A1 | 9/2005 | Robinson | 33/227 |
| 2005/0206891 A1 | 9/2005 | Khubani | 356/249 |
| 2006/0016083 A1 * | 1/2006 | Huang | 33/286 |
| 2006/0037203 A1 * | 2/2006 | Long et al. | 33/286 |
| 2006/0185181 A1 * | 8/2006 | Long et al. | 33/286 |

FOREIGN PATENT DOCUMENTS

| | | |
|---|---|---|
| EP | 0 981 037 A1 | 2/2000 |
| EP | 1 235 051 A2 | 8/2003 |

| EP | 1 357 353 A2 | 10/2003 | GB | 2 383 138 A | 6/2003 |
| EP | 1 367 364 A2 | 12/2003 | GB | 2 389 194 A | 12/2003 |
| EP | 1 367 365 A2 | 12/2003 | GB | 2 390 498 A | 1/2004 |
| EP | 1 367 366 A2 | 12/2003 | | | |
| EP | 1 376 054 A1 | 2/2004 | * cited by examiner | | |

LASER LEVELING DEVICE HAVING A SUCTION MOUNTING ARRANGEMENT

BACKGROUND

This invention relates to a laser leveling device having a suction mounting arrangement for securing the leveling device to an attachment surface.

Laser alignment products are commonly used tools in both the home construction and general construction industries. Laser levels have replaced chalk lines and torpedo levels as the preferred tool for creating and displaying a level line on a surface. These tools are commonly used for interior decorating projects, such as hanging pictures and installing cabinetry, and exterior projects, such as brick laying and deck assembly. Laser levels are easy to set up and generate an alignment beam which does not mark up the mounting surface.

Current laser level products are either mounted on an adjustable frame or are secured to a mounting surface with a fastener. These laser levels include a laser light source mounted within a housing. The laser light source may be rotatably mounted within the housing to allow for either horizontal or vertical transmission of the beam. One limitation of current laser alignment devices is that the laser levels cannot be easily repositioned on surfaces once mounted. Many laser level devices either incorporate a pin or a fastener to mount the level on a vertical surface to generate the alignment line. If the laser level is not properly aligned on the wall, a user will have to remove the device and remount in the proper position, placing additional marks and holes on the surface which must be patched.

It is desirable to provide a laser leveling and alignment device having a suction mounting arrangement which allows the level to be easily mounted and leveled to an attachment surface without damaging the finish of the surface. It is also desirable to provide a vacuum generating mechanism cooperating with the suction mounting arrangement of a laser leveling device which monitors the vacuum mounting seal to ensure proper securement of the device to the surface.

BRIEF SUMMARY

Accordingly, a laser leveling device having a suction mounting arrangement comprises a housing and a mounting seal extending from the lower portion of the housing. The mounting seal extends around a cavity in the lower portion of the housing and cooperates with an attachment surface to define a suction mounting area therebetween. A power source is provided within the housing. In one aspect of the present invention, the power source comprises a removably mounted battery or power cell. In another aspect of the invention, power source is a rechargeable power cell securely mounted within the housing.

The laser leveling device includes a suction mounting arrangement configured to secure the laser leveling device to an attachment surface. A first aspect of the suction mounting arrangement includes a vacuum generating mechanism disposed within the laser level housing which evacuates air from the suction mounting area. The vacuum generating mechanism includes a motor connected to the power source and a pump operatively driven by the motor. A sensor disposed proximate the cavity monitors the vacuum seal in the suction mounting area and activates the pump if the sensor detects a loss of pressure. The pump is configured to remove air from the suction mounting area through an aperture in the cavity to ensure the laser level housing is secured to the attachment surface.

A second aspect of the suction mounting arrangement for the laser leveling device includes a manually operable pump cooperating with the suction mounting arrangement to secure the laser level to an attachment surface. The suction mounting arrangement comprises a manually operable pump cooperating with the mounting seal and configured to remove air from the suction mounting area through an aperture in the housing to secure the housing to the attachment surface.

A third aspect of the suction mounting arrangement includes a lever to actuate a vacuum pad and create an air pocket or suction between the device and the surface on which the device is mounted.

A laser light source is mounted within the housing in a fixed relationship relative to the attachment surface and is operatively connected to the power source. The laser light source includes at least one diode projecting an alignment beam through an opening in the housing to denote a reference plane along the attachment surface. A lens is mounted in an end wall of the housing and cooperates with the at least one diode to project an alignment beam along the attachment surface.

The laser light source includes a single diode projecting an alignment beam through an end wall of the laser level housing. In one aspect of the invention, the laser light source includes a pair of opposing diodes positioned in a coplanar relationship which project alignment beams through opposing end walls of the laser level housing. In another aspect of the invention, the laser light source comprises a first diode projecting a first alignment beam through an opening in the end wall of the housing and a second diode projecting a second alignment beam generally perpendicular to the first alignment beam through an opening in a side wall of the housing.

The laser level housing includes a handle formed in a top portion of the housing. A pump actuation switch is provided on a side wall of the housing adjacent the handle. The pump actuation switch cooperates with the vacuum generating mechanism or manual pump when the laser level is positioned on the attachment surface to evacuate air from the suction mounting area. A switch extends through the housing allowing a user to activate the laser light source when the laser level is mounted to the attachment surface.

DESCRIPTION

Figure 1:
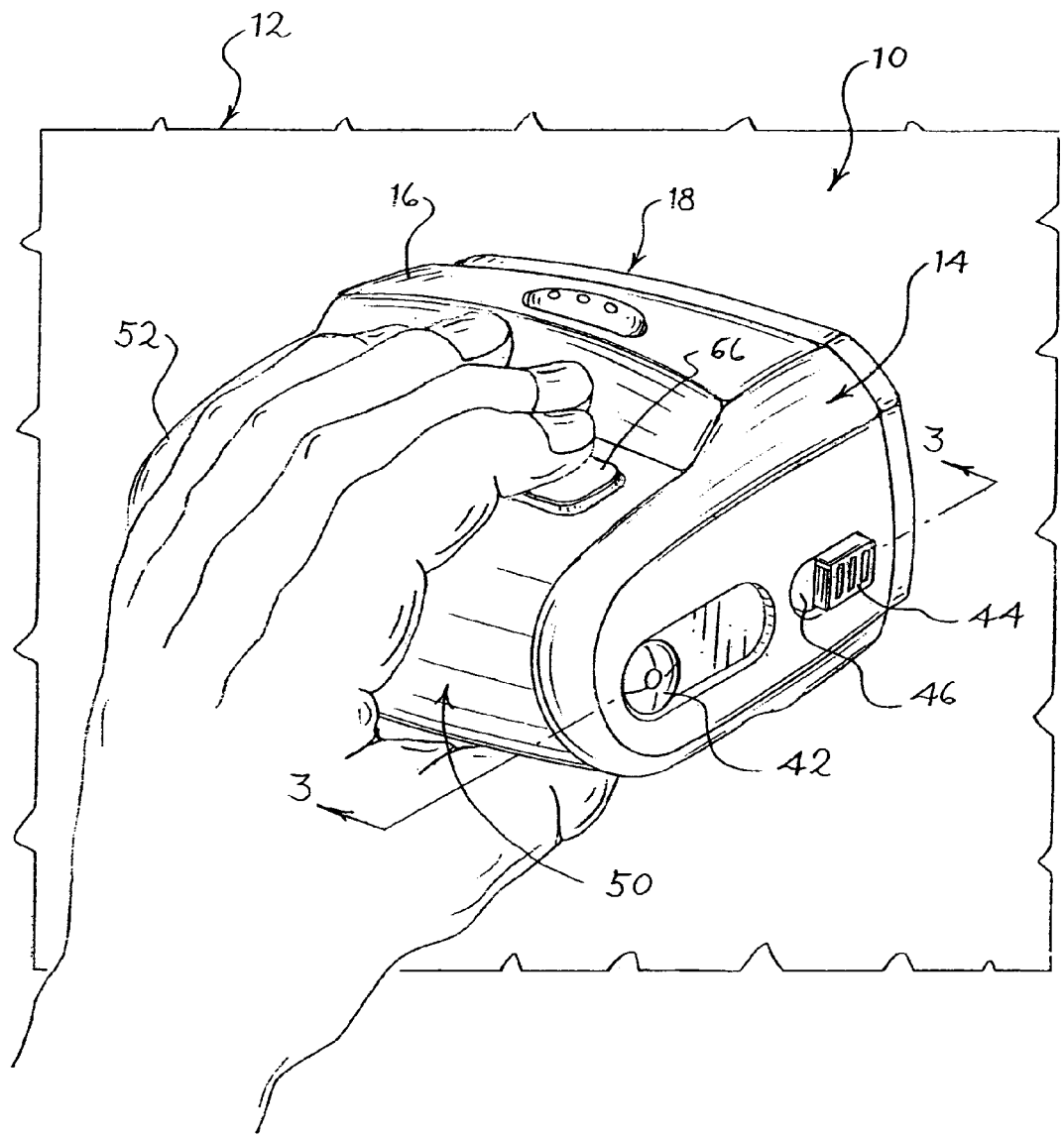
FIG. 1 illustrates a laser leveling device incorporating a vacuum mounting arrangement in accordance with the present invention.
Figure 2:
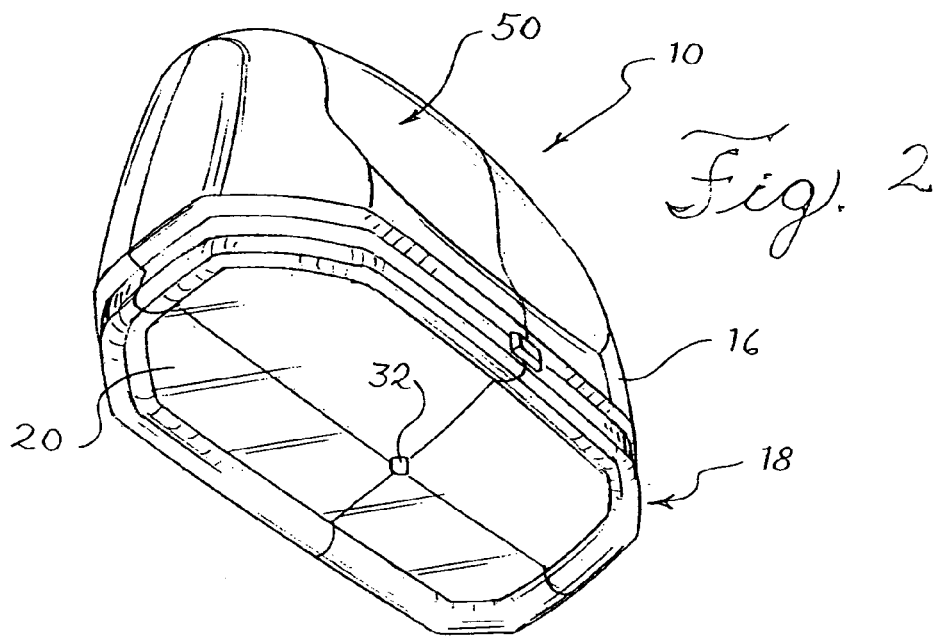
FIG. 2 is a bottom perspective view of the laser level of the present invention.
Figure 3:
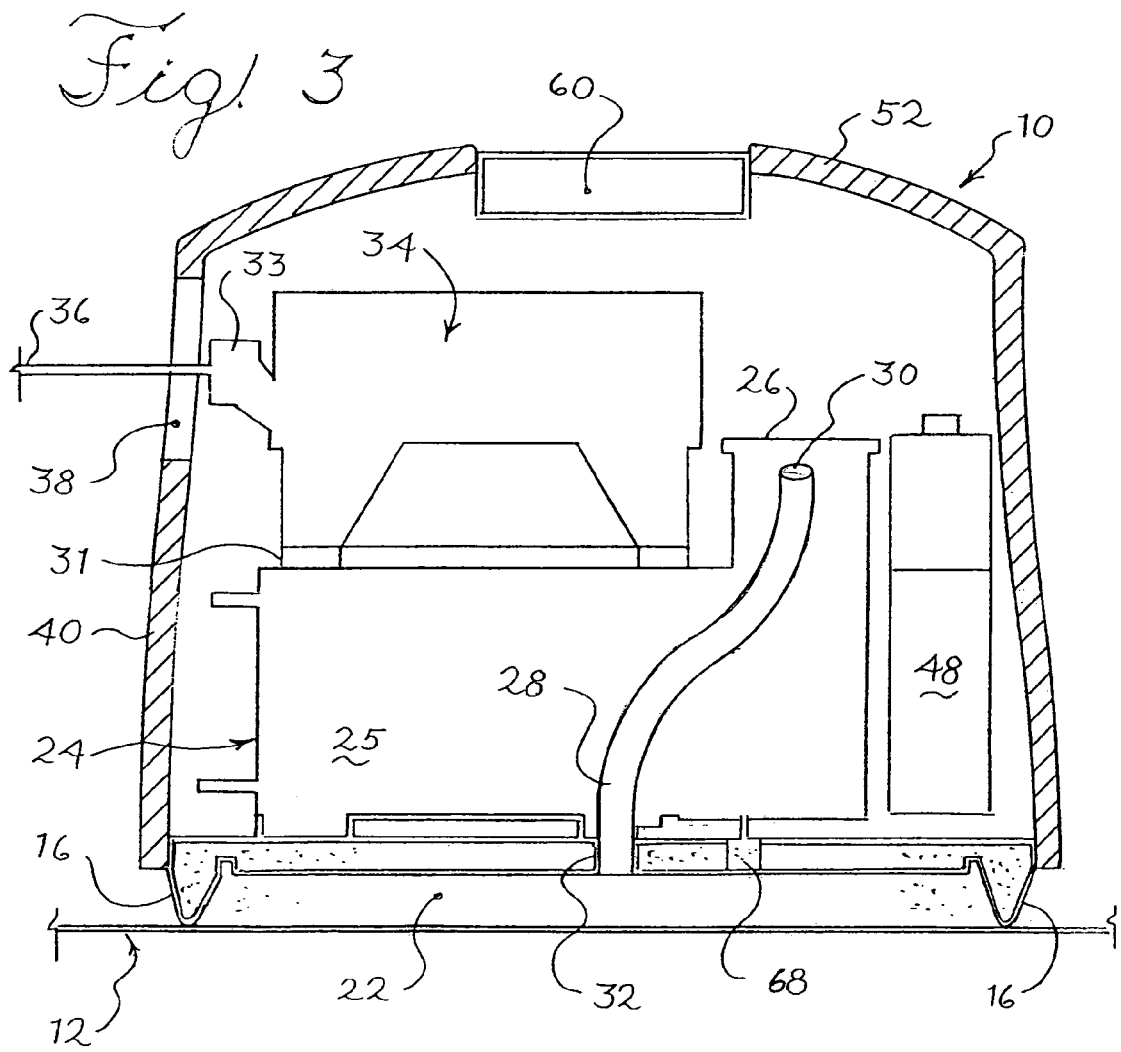
FIG. 3 is a side elevation cross-sectional view of the laser leveling device incorporating one aspect of a suction mounting arrangement along line 3—3 of FIG. 1.
Figure 7:
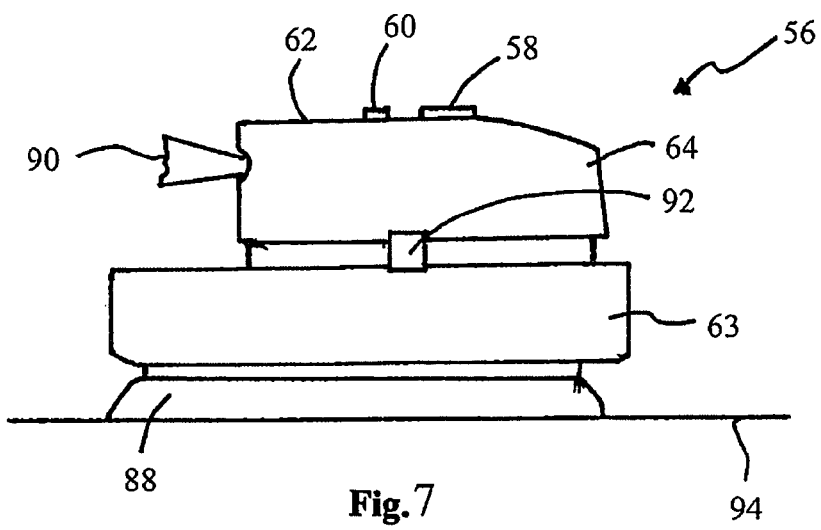
FIG. 7 is a side plan view illustrating a second embodiment of the laser leveling device of the present invention.

Referring now to the Figures, the present invention provides a laser leveling device 10 having a suction mounting arrangement for securing the device 10 to an attachment surface 12. The laser level 10 includes a housing 14 having a suction cup or mounting seal 16 provided on a lower portion 18 of the housing 14. FIGS. 1–3 illustrate a single piece housing 14. It is understood that a two-piece housing as illustrated in FIG. 7 may also be used to accomplish the same objective. A cavity 20 is formed in the lower portion 18 of housing 14. The suction cup or mounting seal 16 is preferably a rubber seal that extends from a lower portion of the housing 14 about the cavity 20. Other elastomeric materials may be used to accomplish the objective of being deformable to provide a seal. The suction cup 16 cooperates with the attachment surface 12 and the cavity 20 in the housing 14 to define a suction mounting area 22 therebetween.

Referring now to FIG. 3, a first aspect of a suction mounting arrangement cooperating with the laser leveling device 10 in accordance with the present invention is disclosed. The laser level 10 includes a vacuum generating mechanism 24 that cooperates with a mounting seal 16 to create a vacuum in the suction mounting area 22. The vacuum generating mechanism includes a motor 25 disposed within the laser level housing 14. A vacuum pump 26 operatively connected to the motor 25 is mounted adjacent the motor 25 in the housing 14. It is also understood that the motor 25 and the pump 26 may be assembled as a single unit. A hose 28 connects an inlet 30 on the pump 26 to an aperture 32 of the cavity 20. The pump 26 cooperates with the mounting seal 16 to create a vacuum between attachment surface 12 and cavity 20 to mount the laser level 10 in a fixed relationship relative to attachment surface 12.

A laser light source 34 for generating an alignment beam 36 is mounted within housing. The laser light source 34 is rotatably mounted to either an inner wall of the housing or a pivot 31 mounted on the vacuum generating mechanism 24 to allow a user to adjust the position of the laser light source 34 once laser level housing 14 is secured to the attachment surface 12. The laser light source 34 may also be mounted to an inner wall of the laser level housing or fixedly mounted to a portion of vacuum generating mechanism.

The laser light source 34 includes at least one diode 33 that projects an alignment beam 36 through an opening 38 in an end wall 40 of the laser level housing 14. In one aspect of the present invention, a lens 42 is provided in the opening 38 that cooperates with at least one diode 33 to focus an alignment beam 36. It is understood that the alignment beam 36 may project through a standard opening in the housing 14 to denote a reference plane along the attachment surface 12.

A laser light source activation switch 44 extends through an elongate channel 46 of the housing 14. A power source 48 disposed in laser level housing 14 powers both the motor 25 and the laser light source 34. In one aspect of the present invention, the power source 48 is a rechargeable battery pack, such as a lithium ion or nickel cadmium power cell securely mounted within housing 14. Alternatively, the power source 48 is a removable alkaline battery.

Referring now to FIGS. 1 and 3, the laser level 10 includes a handle portion 50 formed into a top surface 52 of the housing 14. One or more bubble levels 60 extend along the top portion 52 of the laser level housing 14. Bubble levels 60 assist the operator in positioning the laser level 10 on the attachment surface 12 to ensure that alignment beam 36 projects across surface 12 at the desired angle. In one aspect of the invention shown in FIG. 3, a single bubble level 60 displays the alignment position of the level 10 of surface 12. In another aspect of the laser leveling device 56 shown in FIG. 7, a pair of bubble levels 58, 60 are provided on the top portion 62 of laser level housing 64 to provide both horizontal and vertical alignment information to the operator prior to securement of the laser level 56 to surface 12.

One aspect of the suction mounting arrangement of laser leveling device includes a pump actuation switch 66 that may be provided adjacent handle 50 and is operatively connected to the pump 26. The user actuates switch 66 when the mounting seal 16 is placed in contact with attachment surface 12, allowing the pump 26 to evacuate air from the suction mounting area 22 created between the attachment surface 12, the seal 16 and the cavity 20 through the aperture 32.

A sensor 68 provided proximate the cavity 20 monitors the pressure in the suction mounting area 22. The sensor 68 activates the pump 26 to remove air from the suction mounting area 22 when the sensor detects a loss of vacuum pressure in the area 22 between the mounting seal 16 and the attachment surface 12. Loss of vacuum pressure in the suction mounting area 22 may be caused by imperfections in the attachment surface 12, such as gaps or cracks, that limit the effectiveness of mounting seal 16. The sensor 68 allows the pump 26 to compensate for the surface flaws to ensure a proper seal between the laser level 10 and the attachment surface 12.

Figure 4:
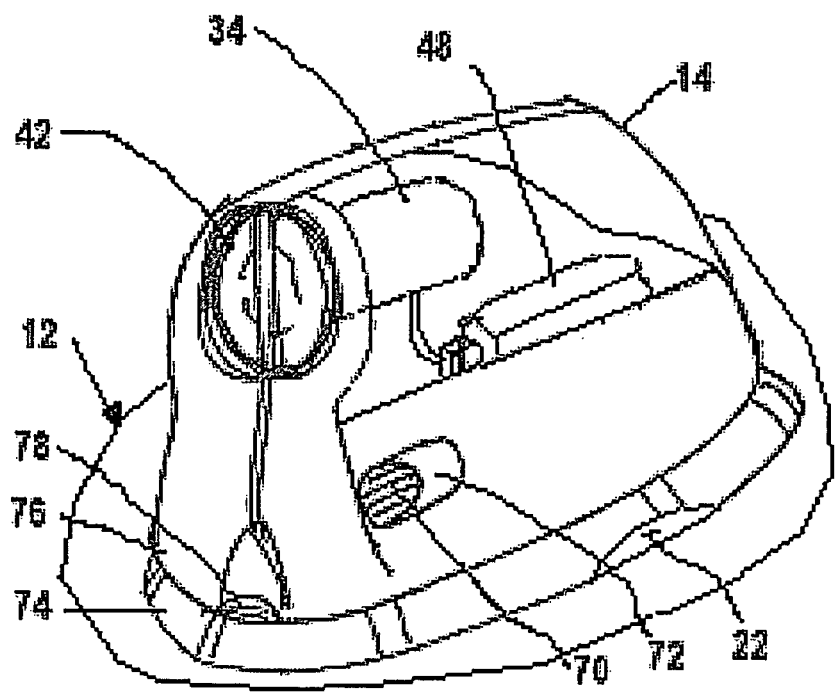
FIG. 4 is a fragmentary perspective illustrating a second aspect of the suction mounting arrangement of the laser leveling device of the present invention.
Figure 5:
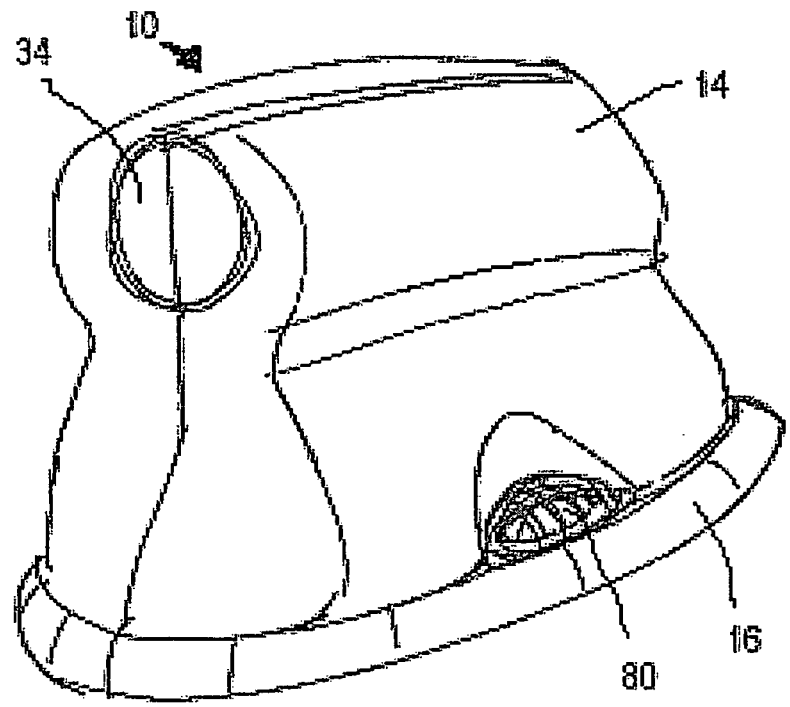
FIG. 5 is a perspective view of the second aspect of the suction mounting arrangement of the laser leveling device of the present invention.

Referring now to FIGS. 4–5, a second aspect of the suction mounting arrangement cooperating with the laser leveling device 10 of the present invention. The laser light source 34 is rotatably mounted to an inner wall of the laser level housing 14 to allow a user to adjust the position of the laser light source 34 once the laser level housing 14 is secured to an attachment surface 12 and to project an alignment beam through the lens 42 onto a surface.

A laser light source activation switch 70 extends through an elongate channel 72 of the housing 14. A power source 48 disposed in the laser level housing 14 powers laser light source 34. A suction cup or mounting seal 74 extends from a lower portion 76 of laser level housing 14. It is understood that the suction cup 74 can be formed in a variety of geometries to accommodate various housing shapes. The mounting seal 74 cooperates with the attachment surface 12 to define a suction mounting area 22 therebetween.

A pump 78 is operatively connected to an aperture (not shown) in the lower portion 76 of housing 14. The pump 78 cooperates with the mounting seal 74 to create a vacuum between the attachment surface 12 and the lower portion 76 of laser level housing 14 to create a suction mounting area 22. A pump actuation switch 80 is operatively connected to the pump 78 adjacent the lower portion 76 of the housing 14 and the mounting seal 74. A user actuates the switch 80 after the mounting seal 74 is placed in contact with the attachment surface 12, allowing the pump 78 to evacuate air from the suction mounting area 22 if the user detects a loss of vacuum pressure in the area 22. It is understood that the switch 80 may be provided in either a vertical or horizontal orientation on the laser level housing 14.

Figure 6:
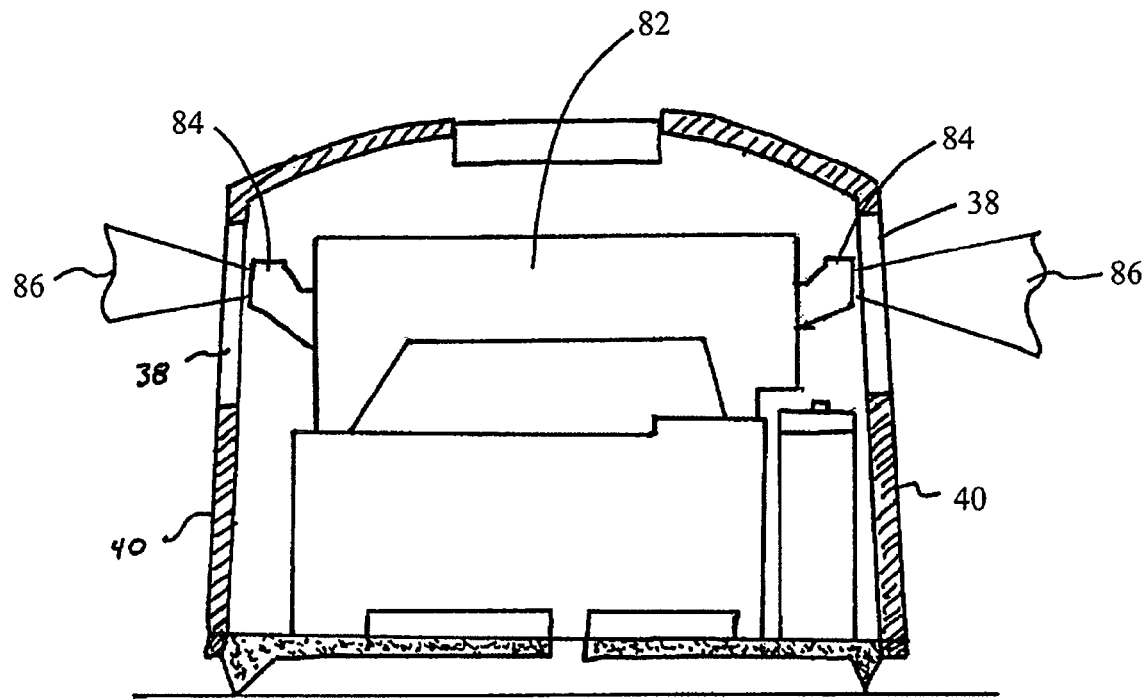
FIG. 6 is a cross-sectional view illustrating another aspect of the laser level generator of the laser leveling device of the present invention.

FIG. 6 illustrates another type of laser light source incorporated in the laser leveling device 10 of the present invention. The laser level 10 includes a laser light source 82 having a pair of diodes 84 in a coplanar relationship that project alignment beams 86 through openings 38 in the end walls 40 of the laser level housing 14. It is also contemplated that laser light source may include a first diode which projects a first alignment beam through a first opening in the end or side wall of the housing and a second diode projecting a second alignment beam generally perpendicular to the first alignment beam through a second opening in an end or side wall of the housing.

Referring now to FIG. 7, a second embodiment of a laser leveling device having a vacuum mounting arrangement of the present invention is disclosed. The laser level 56 comprises a lower housing 63 having a rubber mounting seal 88 extending from a lower portion of housing 63 and a pivotally mounted upper housing 64 enclosing a laser light source generating an alignment beam 90. The upper housing 64 pivots relative to the lower housing 63 about a mount 92. The mount 92 includes detents (not shown) that allow a user to position the upper housing 64 at discrete angular increments, for example, 15° angle increments, relative to the lower housing 63, thereby allowing a user to rapidly reposition the laser light source in the upper housing 64 when the laser level 56 is secured to the attachment surface 94.

Figure 8:
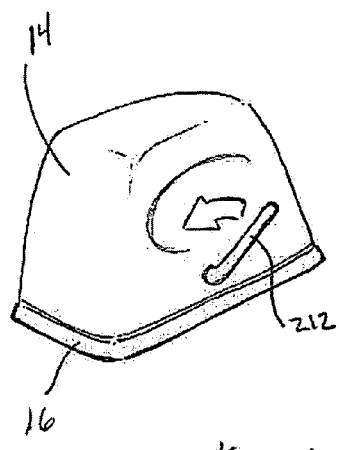
FIG. 8 is a perspective view of another embodiment of the device of the present invention having a manually operable vacuum attachment.
Figure 9:
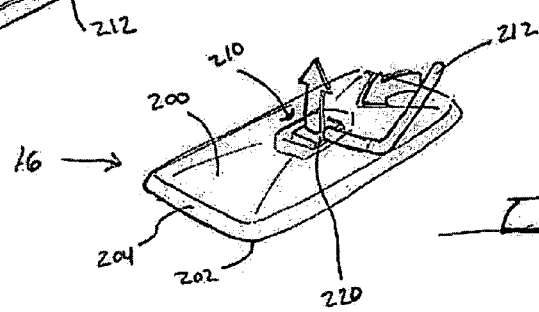
FIG. 9 is a perspective view of the device of FIG. 7 with the laser portion removed.
Figure 10:
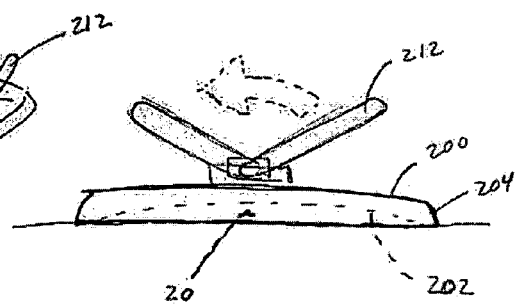
FIG. 10 is a side perspective view of the device of FIG. 7 with the laser portion removed and schematically showing operation of the lever and the vacuum pad.

Referring now to FIGS. 8–10 another embodiment of the device of the present invention having a manual suction mounting arrangement is shown. In this embodiment, the housing 14 is provided with a mounting seal 16 as described above with other alternative embodiments. The mounting seal 16 is provided with a top surface 200, a bottom surface 202 and a wall 204 extending from the top surface 200 to contact the attachment surface 12 and form a seal, as will be described below.

A lifting mechanism 210 provided on the top surface 200 of the mounting seal cooperates with the bottom surface 202 such that actuation of the lifting mechanism 210 lifts the bottom surface 202 to create a cavity 20. The lifting mechanism 210 can be provided with a lever 212 that extends from a portion of the housing 14 such that movement of the lever 212 actuates the lifting mechanism 210. As shown in FIGS. 8–10, the lever 212 is rotated from a first position to a second position (counter clockwise direction) such that in the first position, there is no suction and in the second position there is a suction or vacuum when the cavity 20 is created.

Desirably, the lever 212 is fixed in either the first or the second position until manually moved to the other position. As shown in FIG. 9, the lifting mechanism 210 may include a cam 220 operatively connected to the bottom surface 202 such that rotation of the lever 212 causes the cam 220 and thus the bottom surface 202 to move toward the top surface 200 and thereby create a cavity 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A laser leveling device comprising:
   a. a housing;
   b. a mounting seal extending from a lower portion of the housing and cooperating with an attachment surface to define a suction mounting area therebetween;
   c. a suction mounting arrangement cooperating with a mounting seal to maintain the suction mounting area, wherein the suction mounting arrangement includes a vacuum generating mechanism including a motor connected to a power source disposed within the housing, a pump operatively driven by the motor and configured to remove air from the suction mounting area to secure the housing to the attachment surface; and
   d. a laser light source that is selectively rotatable with respect to the suction mounting area, the laser light source including at least one diode projecting an alignment beam to denote a reference plane along the attachment surface.

2. The laser leveling device of claim 1 wherein the laser light source comprises opposing diodes positioned in a coplanar relationship projecting alignment beams in different directions.

3. The laser leveling device of claim 1 wherein the laser light source comprises a first diode projecting a first alignment beam and a second diode projecting a second alignment beam generally perpendicular to the first alignment beam.

4. The laser leveling device of claim 1 wherein the power source comprises a removably mounted battery.

5. The laser leveling device of claim 1 wherein the power source comprises a rechargeable power source mounted within the housing.

6. The laser leveling device of claim 1 further comprising a sensor mounted proximate the aperture in the lower portion of the housing which activates the pump if the sensor detects a loss of vacuum in the suction mounting area.

7. The laser leveling device of claim 1 wherein the laser light source is mounted to the vacuum generating mechanism to position the at least one diode in a planar relationship relative to the attachment surface.

8. The laser leveling device of claim 1 wherein the laser light source is rotatable at discrete angular increments.

9. The laser leveling device of claim 1 wherein the laser light source selectively projects an alignment beam on the attachment surface at a selected angle between 0° and 360°.

10. A laser leveling device having a vacuum mounting arrangement configured to releasably secure the laser leveling device to an attachment surface, the laser level comprising:
   a. a housing having a cavity formed in a lower portion of the housing;
   b. a mounting seal extending from the lower portion of the housing about the cavity cooperating with an attachment surface to define a suction mounting area therebetween;
   c. a power source disposed within the housing;
   d. a vacuum generating mechanism disposed within the housing for generating a vacuum in the suction mounting area, the vacuum mounting arrangement including a motor connected to the power source, a pump operatively driven by the motor configured to remove air from the suction mounting area to secure the housing to the attachment surface and a sensor disposed proximate the cavity to monitor the pressure in the suction area and activate the pump if the sensor detects a loss of pressure in the suction mounting area; and e. a laser light source being rotatable with respect to the mounting seal, the laser light source including at least one diode projecting an alignment beam through an opening in the housing to denote a reference plane along the attachment surface.

11. The laser leveling device of claim 10 wherein the laser light source comprises opposing diodes positioned in a coplanar relationship projecting alignment beams in different directions.

12. The laser leveling device of claim 10 wherein the laser light source comprises a first diode projecting a first alignment beam and a second diode projecting a second alignment beam generally perpendicular to the first alignment beam.

13. The laser leveling device of claim 10 wherein the laser light source selectively projects an alignment beam on the attachment surface at a selected angle between 0° and 360°.

14. A laser leveling device comprising:

a. a housing;

b. a mounting seal extending from a lower portion of the housing;

c. a suction mounting arrangement cooperating with a mounting seal, wherein the suction mounting arrangement includes a vacuum generating mechanism including a motor connected to a power source disposed within the housing, a pump operatively driven by the motor and configured to remove air; and, d. a laser light source that is selectively rotatable with respect to the suction mounting arrangement, the laser light source including at least one diode projecting an alignment beam to denote a reference plane.

* * * * *